J. B. SPEED & A. E. WRIGHT.
LIQUID METER.
APPLICATION FILED AUG. 17, 1908.
935,129.
Patented Sept. 28, 1909.
2 SHEETS—SHEET 1.
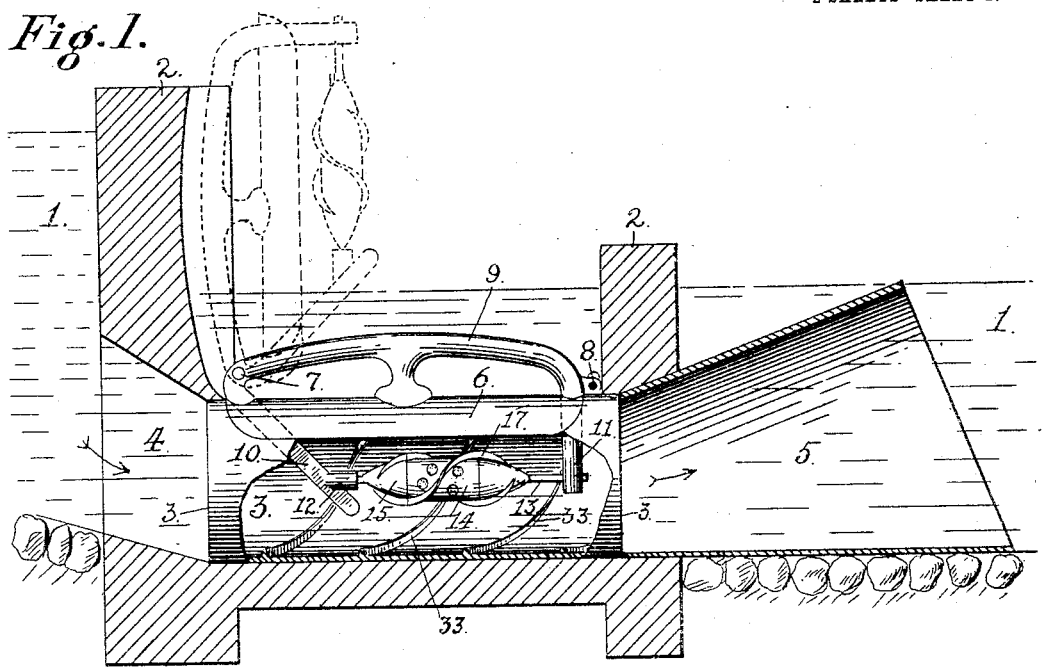
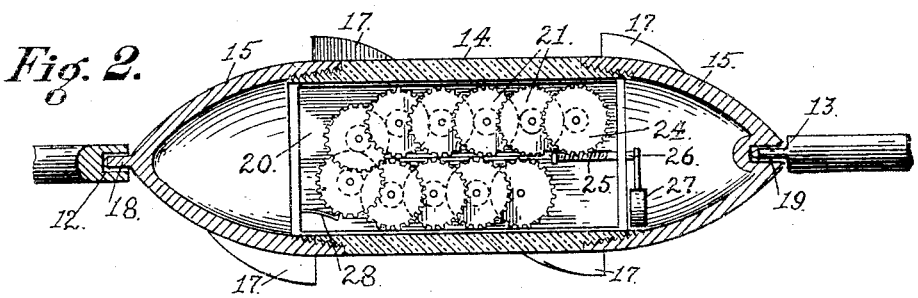
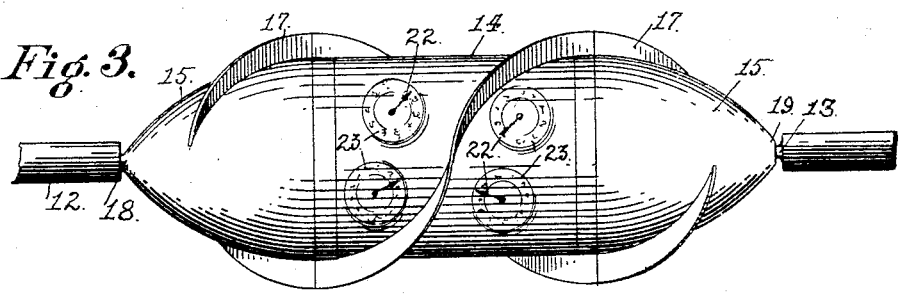
WITNESSES.
Arthur L Slee.
L O'Connor.
INVENTORS.
James Buckner Speed
and Albert Eugene Wright
by Wm F. Booth
their Attorney.

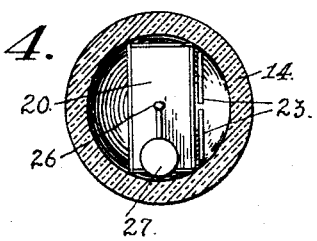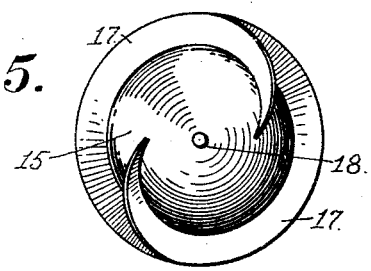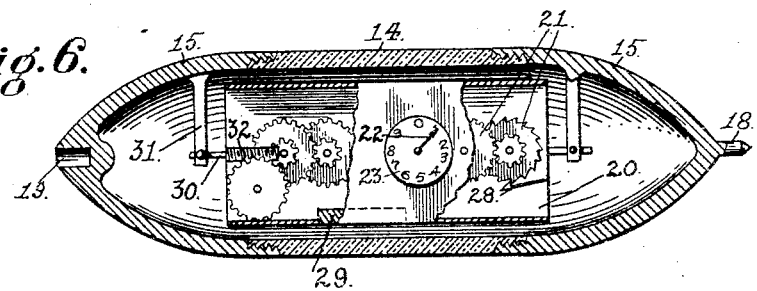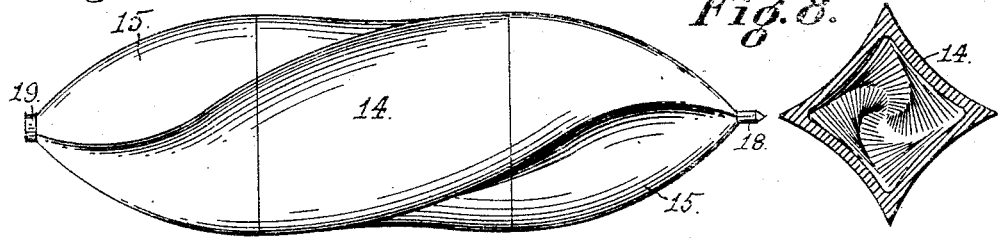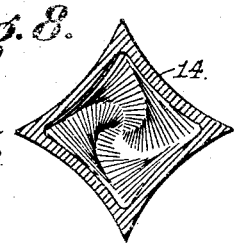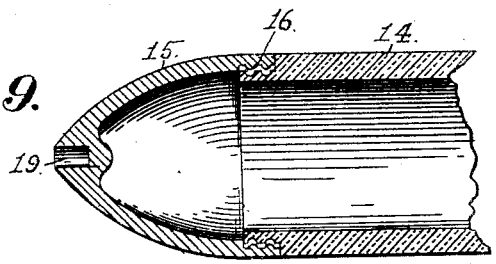

UNITED STATES PATENT OFFICE.

JAMES BUCKNER SPEED AND ALBERT EUGENE WRIGHT, OF BERKELEY, CALIFORNIA.

LIQUID-METER.

935,129.  Specification of Letters Patent.  Patented Sept. 28, 1909.

Application filed August 17, 1908. Serial No. 448,867.

*To all whom it may concern:*

Be it known that we, JAMES BUCKNER SPEED and ALBERT EUGENE WRIGHT, citizens of the United States, residing at Berkeley, in the county of Alameda and State of California, have invented certain new and useful Improvements in Liquid-Meters, of which the following is a specification.

Our invention relates to the class of liquid-meters, and is primarily intended for measuring the amount of water flowing in irrigation ditches.

The object of our invention is to provide a simple and effective meter for this purpose, which may be economically manufactured, easily installed, and conveniently read.

To attain these results, our invention consists in the novel liquid-meter which we shall hereinafter fully describe.

Referring to the accompanying drawings, Figure 1 is a side elevation, broken and partly in section, showing our meter in position. Fig. 2 is a longitudinal section of the spindle whose revolutions are recorded. Fig. 3 is a side elevation of the same. Fig. 4 is a cross section of the same. Fig. 5 is an end view of said spindle. Fig. 6 is a cross section of a revoluble spindle, showing a modification in the arrangement of its registering mechanism. Fig. 7 is an elevation showing a modification in the helical exterior of the spindle. Fig. 8 is a section of the modified spindle of Fig. 7. Fig. 9 is a sectional detail showing a modification in the attachment of the metallic ends of the spindle to its glass body.

In Fig. 1, the ditch, indicated by 1, is intercepted by spaced walls 2, between which is placed a conduit 3, through which all the water in the ditch is made to pass. In order to reduce the amount of difference in level of the water entering and leaving the conduit, the entrance 4 to it, and the exit 5 from it, are flared as shown, the flare of the exit or down-stream end being longer and more tapering than the up-stream end. The conduit 3 is so cut that its upper portion forms a cover 6, which is hinged at 7, and provided with a lock at 8. A handle 9 is secured to the conduit cover 6. This handle can be reached from above, in the space betwen the walls 2, and by taking hold of it, the cover 6 can be lifted to the position shown in dotted lines. When closed down and locked, the meter cannot be tampered with. To the under side of the cover 6 is secured near one end, a hanger 10, which is best made thin, and is made to slope in the direction of the water flow to avoid catching weeds and other debris, and to said cover near its other end is secured a hanger 11. In the lower end of hanger 10 is made a socket bearing 12, and the lower end of the hanger 11 is formed or provided with a pivot pin 13.

In Figs. 2 and 3, the revoluble spindle comprises a hollow body portion 14 of transparent material, in practice, glass, and end sections 15, preferably of metal. The end sections may be secured to the body portion in any suitable manner. In these figures they are shown as screwed upon it. In Fig. 9, they are shown as connected by a body of cement 16 lying between roughened, ribbed or grooved surfaces. The whole spindle is of a double conical shape, and its exterior is helically ribbed or flanged. This helical ribbing may be effected in any suitable manner. In Figs. 2 and 3 the helical ribs are formed of flanges 17, secured to the spindle. In Figs. 7 and 8 the spindle is twisted to provide the necessary helical surface. One of the end sections 15 of the spindle, is formed with a pivot point 18, and the other end section is formed with a bearing socket 19. The spindle is pivotally suspended within the conduit 3, so that by the flow of the water through the conduit, acting on its helical surface, it will turn on its axis. As shown in Fig. 1, the mounting of the spindle is by fitting its pivot point 18 into the socket bearing 12 of the hanger 10, and by fitting its socket bearing 19 upon the pivot pin 13 of the hanger 11. The spindle is thus suspended from the cover 6 of the conduit, and when said cover is turned up, the spindle will come with it, out of the conduit, as shown in dotted lines in Fig. 1, and its record may be read. Upon replacing the cover, the spindle will again be returned to its place in the conduit. This arrangement of pivots is such as to protect them from passing debris.

Within the transparent hollow body 14 of the spindle, and wholly inclosed thereby, is a registering mechanism to record the number of its revolutions, the readings of said record being made through the glass. This mechanism may be of any suitable character. The form shown in Fig. 2 consists of a box 20, which is firmly secured within the body 14 and turns with said body. Within the box is a train of gears 21, the arbors of which operate fingers 22, playing over dials 23, on the outside of the box 20, and which are seen through the glass body 14 of the spindle. One member of the gear train is a worm gear 24, which meshes with a worm 25 on a shaft 26 pivotally mounted in the axis of the spindle. This shaft projects from the end of the box 20 and is held from turning by a weight 27, hanging from its end. The whole spindle turns about shaft 26, thereby, through the worm 25 on said shaft, and the worm gear 24, effecting the movement of the gear train and the operation of its registering fingers 22, thus furnishing a record of the number of revolutions of the spindle. A retaining pawl 28 engaging the terminal gear of the train prevents the mechanism from being turned backward.

In Fig. 6 another arrangement of registering mechanism is shown. In this form the mechanism is pivotally mounted at its ends within the spindle, and is kept from rotating with said spindle by means of a weight 29 in its lower portion. One of the pivots of the mechanism is a shaft 30 which lies in the axis of the spindle and is connected with said spindle by an arm 31, so that it rotates with it. Through the worm 32 on this shaft motion is transmitted to the gear train. In order to promote the turning of the spindle by the flow of the water, a swirling action of the water passing through the conduit, may be had by placing or forming on the inner surface of the conduit, helically directed flanges 33, as shown in Fig. 1, the twist of said flanges being in a direction opposite to that of the helical flanges on the spindle.

In practice, it will be well to so proportion the air space or cavity in the spindle that it will about float in the water, thereby reducing friction on the bearings.

Having thus described our invention, what we claim as new and desire to secure by Letters Patent is:—

1. A liquid-meter comprising a conduit through which the liquid to be measured is made to flow, said conduit having a cover adapted to be lifted; a hollow member revolubly suspended, within the conduit, from said cover, and adapted, by the lifting of the cover, to be removed from the conduit, said member being provided with a surface adapted, by the impingement thereon of the flowing stream, to effect its revolution; and means wholly inclosed within the cavity of said member to register the number of its revolutions.

2. A liquid-meter comprising a conduit through which the liquid to be measured is made to flow, said conduit having a cover adapted to be lifted; a hollow member with a transparent wall, revolubly suspended, within the conduit, from said cover, and adapted, by the lifting of the cover, to be removed from the conduit, said member being provided with a surface adapted, by the impingement thereon of the flowing stream, to effect its revolution; and means wholly inclosed within the cavity of said member to register the number of its revolutions, said registration being exposed behind the transparent wall.

3. A liquid-meter comprising a conduit through which the liquid to be measured is made to flow, said conduit having a hinged cover; a spindle revolubly suspended within the conduit, from its hinged cover, and adapted by throwing said cover back to be removed from the conduit, said spindle consisting of a transparent hollow body portion, and metallic ends and having upon its exterior helically directed flanges adapted, by the impingement of the flowing stream thereon, to effect the revolution of said spindle; and a registering mechanism wholly inclosed within said hollow transparent body portion of the spindle, to register the number of its revolutions, the said registration being exposed through the transparent body portion.

4. A liquid-meter comprising a conduit through which the liquid to be measured is made to flow, said conduit having a cover adapted to be lifted; a member revolubly suspended, within the conduit, from said cover, and adapted by the lifting of the cover to be removed from the conduit, said member being provided with a surface adapted, by the impingement thereon of the flowing stream, to effect its revolution, and means for registering the revolutions of said member.

In testimony whereof we have signed our names to this specification in the presence of two subscribing witnesses.

JAMES BUCKNER SPEED.
ALBERT EUGENE WRIGHT.

Witnesses:
  WM. F. BOOTH,
  D. B. RICHARDS.